United States Patent
Miyahara et al.

(10) Patent No.: US 6,786,531 B2
(45) Date of Patent: Sep. 7, 2004

(54) VEHICLE CLOSURE BODY STRUCTURE AND RELATED METHOD

(75) Inventors: Fumitake Miyahara, Isehara (JP); Akira Nakazato, Sagamihara (JP)

(73) Assignee: Nissan Motor Co., Ltd., Kanagawa-ken (JP)

(*) Notice: Subject to any disclaimer, the term of this patent is extended or adjusted under 35 U.S.C. 154(b) by 0 days.

(21) Appl. No.: 10/349,317

(22) Filed: Jan. 23, 2003

(65) Prior Publication Data

US 2003/0141743 A1 Jul. 31, 2003

(30) Foreign Application Priority Data

Jan. 23, 2002 (JP) ..................................... P2002-014147

(51) Int. Cl.⁷ .................................................. B60J 5/00
(52) U.S. Cl. ................................ 296/146.1; 296/146.6; 296/146.7; 296/76; 49/502
(58) Field of Search ............................... 296/146.1, 76, 296/208, 146.8, 37.13, 50, 191, 146.5–146.7; 49/502

(56) References Cited

U.S. PATENT DOCUMENTS

| 4,815,984 | A | * | 3/1989 | Sugiyama et al. | 439/211 |
| 5,466,036 | A | * | 11/1995 | Stroeters et al. | 296/208 |
| 5,605,371 | A | * | 2/1997 | Borchelt et al. | 296/187.09 |
| 5,877,936 | A | * | 3/1999 | Nishitani et al. | 361/600 |
| 6,019,418 | A | * | 2/2000 | Emerling et al. | 296/146.8 |
| 6,079,765 | A | * | 6/2000 | Zaguskin et al. | 296/146.1 |
| 6,135,538 | A | * | 10/2000 | Serizawa et al. | 296/146.7 |
| 6,354,651 | B1 | * | 3/2002 | Mori | 296/146.1 |
| 6,431,638 | B1 | * | 8/2002 | Mrozowski et al. | 296/146.8 |

FOREIGN PATENT DOCUMENTS

JP 2001-322565 11/2001

* cited by examiner

*Primary Examiner*—D. Glenn Dayoan
*Assistant Examiner*—Gregory A Blankenship
(74) *Attorney, Agent, or Firm*—McDermott Will & Emery LLP

(57) ABSTRACT

A vehicle closure body structure is provided with an outer panel, an inner panel opposed to the outer panel, with the outer panel and the inner panel forming a hollow structure of a closure body adapted to be mounted to an opening portion of a vehicle body through a hinge secured to the inner panel, a reinforce joined to the inner panel, inside the closure body, in at least a hinge fixing area thereof at which the hinge is fixed, and a tunneled portion formed in the reinforce to form a passage between the tunneled portion and the inner panel so as to permit wiring harness to be arranged therein.

11 Claims, 2 Drawing Sheets

VEHICLE CLOSURE BODY STRUCTURE AND RELATED METHOD

BACKGROUND OF THE INVENTION

The present invention relates to a vehicle closure body structure and a related method and, more particularly, to an internal structure of a vehicle closure body, which can be applied to a trunk lid, an engine hood and doors of an automotive vehicle to be opened and closed, and its related method of arranging wiring harness in a vehicle closure body structure such that the wiring harness is routed and equipped in the vehicle closure body structure.

In general, a vehicle closure body is applied to a trunk lid, an engine hood, a back door and side doors of an automotive vehicle to be opened and closed, preferably.

Japanese Patent Application Laid-Open Publication No. 2001-322565 discloses a structure wherein a closure body is mounted to an opening portion of a vehicle body by means of hinges for opening and closing capabilities. The closure body has a hollow structure composed of an outer panel and an inner panel and has one terminal end, formed with hinge fixing areas, with which a reinforcement is joined at an inner side of the closure body for reinforcement.

SUMMARY OF THE INVENTION

However, upon careful studies undertaken by the present inventors, since the closure body has a door lock or a device, such as a lamp, required to be supplied with an electric power, wiring harness must be arranged to be accurately routed and surely equipped for supplying the electric power in an area between the vehicle body and an electric power demanded area of the closure body. When this takes place, introduction of the wiring harness may be preferably carried out from a periphery of the hinge fixing area with the least amount of movement during opening or closing operations of the closure body. Then, a worker conducts the arranging operation while forcibly pushing the wiring harness, of which distal end is inserted to an inner space of the closure body, to cause the distal end of the wiring harness to reach the electric power demanded area.

When performing the arranging operation of the wiring harness, since the worker needs to perform an invisible operation wherein the worker is hard to look at the distal end of the wiring harness remaining in the inner space of the closure body, the worker has no choice but to rely on only his sense of feeling. For this reason, it is conceivable that if the worker is not a skilled person, then it takes much time for him to complete the arranging operation while there is a probability wherein the wiring harness is arranged in a wrong path different from a preset pattern.

The present invention has been completed upon the above studies conducted by the inventors and has an object of the present invention to provide a vehicle closure body structure and a related method which enable wiring harness to be easily and precisely arranged without the need for a skilled person.

To achieve the above object, the present invention provides a vehicle closure body structure comprising: an outer panel; an inner panel opposed to the outer panel, with the outer panel and the inner panel forming a hollow structure of a closure body adapted to be mounted to an opening portion of a vehicle body through a hinge secured to the inner panel; a reinforcement joined to the inner panel, inside the closure body, in at least a hinge fixing area thereof at which the hinge is fixed; and a tunneled portion formed in the reinforcement to form a passage between the tunneled portion and the inner panel so as to permit wiring harness to be arranged therein.

Stated another way, the present invention provides a vehicle closure body structure comprising: an outer panel; an inner panel opposed to the outer panel, with the outer panel and the inner panel forming a hollow structure of a closure body adapted to be mounted to an opening portion of a vehicle body through a hinge secured to the inner panel; a reinforcement joined to the inner panel, inside the closure body, in at least a hinge fixing area thereof at which the hinge is fixed; and forming means for forming a passage so as to permit wiring harness to be arranged therein in connection with the inner panel, the forming means being disposed in the reinforcement. On the other hand, the present invention provides a method of arranging a harness in a vehicle closure body, which has an outer panel, an inner panel opposed to the outer panel and a reinforcement joined to the inner panel, and which is mounted to an opening portion of a vehicle body through a hinge fixed to the inner panel, the method comprising: pulling out a terminal portion of wiring harness, which is internally arranged through a vehicle body, from a takeoff hole formed at a periphery of an opening portion of the vehicle body; forcing the terminal portion of the wiring harness into an inside of the closure body; permitting the wiring harness to travel through the inside of the closure body while guiding the terminal portion of the wiring harness through a tunneled portion formed in the reinforcement; and taking out the terminal portion of the wiring harness from an opening portion of the closure body.

Other and further features, advantages, and benefits of the present invention will become more apparent from the following description taken in conjunction with the following drawings.

DETAILED DESCRIPTION OF THE PREFERRED EMBODIMENT

A vehicle closure body structure of an embodiment according to the present invention and its related method are described below with reference to FIGS. 1 and 2. Also, it is to be noted that the present embodiment is herein described in conjunction with an example wherein the vehicle closure body includes a trunk lid to be opened and closed.

Figure 1:
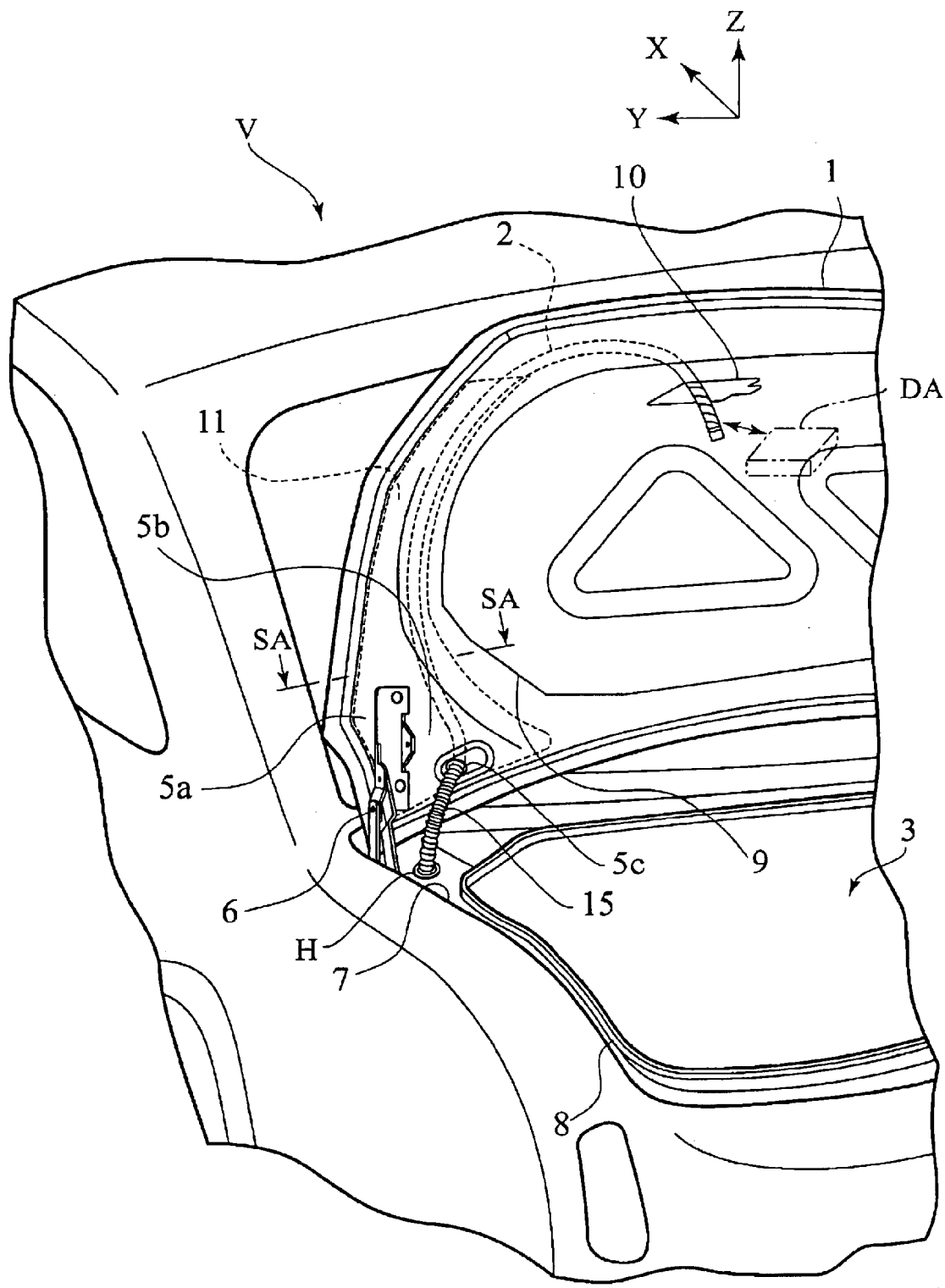
FIG. 1 is a perspective partial view illustrating a trunk lid forming a vehicle closure body of an embodiment according to the present invention.
Figure 2:
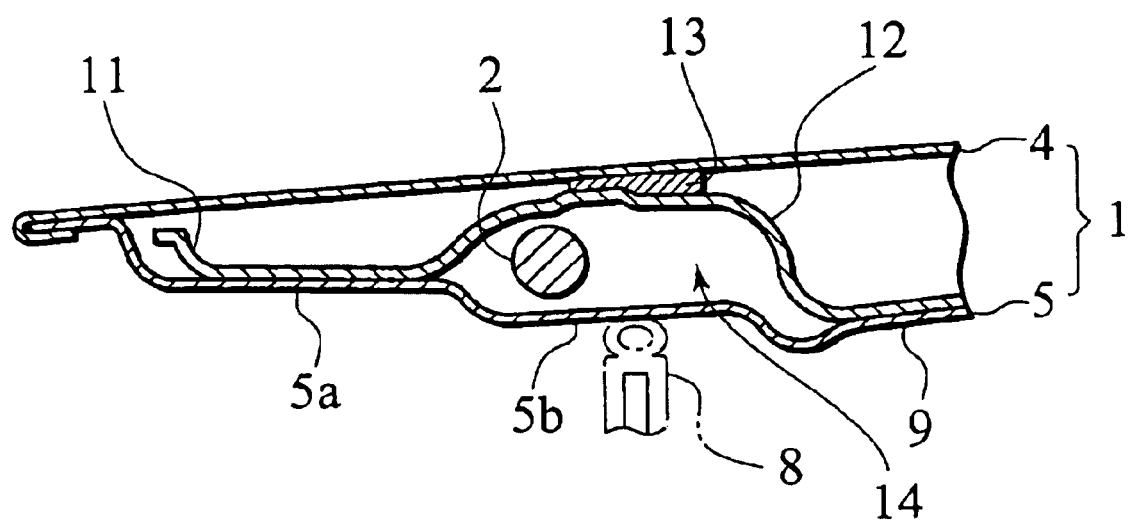
FIG. 2 is a cross sectional view taken on line A—A of FIG. 1.

As shown in FIGS. 1 and 2, the presently filed embodiment is described in conjunction with a structure wherein wiring harness 2, which allows an actuator DA of a trunk lock to be supplied with electric power, is arranged in an internal space in a trunk lid 1 that serves as a vehicle closure body at a rear area of a vehicle (vehicle body) V. Also, in the figures, the wiring harness 2 and the actuator DA of the trunk lock are illustrated to be arranged on the middle way, and directional terms, such as "X-direction", "Y-direction" and "Z-direction" to indicate a forward direction in a fore and aft direction of the vehicle body, a leftward direction in a widthwise direction of the vehicle body and an upper direction of the vehicle body, respectively, are used for convenience in referring to the accompanying drawings.

The rear area of the vehicle body is formed with a trunk opening portion 3 in compliance with the trunk lid 1 for enabling putting in and out of a baggage. Mounted for closing the trunk opening portion 3 for opening and closing capabilities is the trunk lid 1. The trunk lid 1 has a hollow structure composed of an outer panel 4 and an inner panel 5.

Both of right and left sides of a front end of the inner panel 5 of the trunk lid 1 are provided with hinge fixing areas 5a. Upper portions of a pair of hinges 6 of so-called four-link types are mounted to the hinge fixing areas 5a, respectively. Lower portions of the hinges 6 are pivotally supported with side walls 7 located at both sides of the trunk opening portion 3 in the widthwise direction of the vehicle body. This enables the trunk lid 1 to be rotated, such that a rear end of the trunk lid 1 is moved upward about a center of the front end to which the hinge 6 is mounted, to open the rear end upward, while enabling the rear end of the trunk lid 1 to be closed downward to its original position. Also, since the hinges 6 are of the four-link types, the movement of the front end of the trunk lid 1 is limited during the opening and closing operations of the trunk lid 1. Of course, the present invention is not limited to the hinge 6 of the four-link type and suitable employments of other link structures, such as a one-link structure, are not objectionable.

A sealing surface 5b extends from the hinge fixing areas 5a into a central area of the inner panel 5 into abutting engagement with a seal portion 8 made of resilient material covered in a circumferential periphery of the trunk opening portion 3. The sealing surface 5b has a moderate rigidity and a flat shape in order to obtain a closed contact condition with the seal portion 8, causing the seal portion 8 to be abutted. In addition, a rigid bone 9, having a higher rigidity than that of other areas to provide an increased rigidity of the inner panel 5, is formed in the inner panel 5 to lie in a more central area than the sealing surface 5b of the inner panel 5. The rigid bone 9 is configured such that the inner panel 5 is embossed upward at an area inside a protruded area, which forms a downward convex configuration as shown in FIG. 2 so as to be displaced from the outer panel 4. Also, a periphery of the rigid bone 9 is not limited to such a particular shape and may take other configurations such as a protrusion of a convex shape that is close to the outer panel 4, provided that there is no need for consideration for probabilities of interference with a reinforcement 11, which will be described later, or of undesirably narrowing a tunneled portion 12.

A rear portion of the inner panel 5 is formed with a mount opening 10, serving as an electric power demanded area, to permit the actuator DA for the trunk lock to be installed.

By the way, the reinforcement 11 is joined to the inner panel 5 at an inner side of the trunk lid 1 for reinforcement thereof. More particularly, the reinforcement 11 has a greater size than the hinge fixing area 5a and extends toward the central area in the widthwise direction to reach the rigid bone 9 while the reinforcement 11 further extends longitudinally rearward toward a position lying at a rear end portion of the mount opening 10. Also, the reinforcement 11 is joined to the inner panel 5 at the hinge fixing area 5a and, in some instances, may be joined to the inner panel 5 at the rigid bone 9 or the vicinity thereof.

Further, the reinforcement 11 is formed such that the tunneled portion 12, which extends along a path of the wiring harness 2 arranged from the front end of the trunk lid 1 to the mount opening 10 for supplying the electric power, has an upwardly extending protruding configuration closer to the outer panel 4 as viewed in FIG. 2. That is, the tunneled portion 12 has a top wall projecting upward in close proximity to the outer panel 4 or has a height to cause the tunneled portion 12 to be brought into contact with the outer panel 4, and the tunneled portion 12 of the reinforcement 11 and the outer panel 4 are adhered with a mastic adhesive 13 and joined to one another at a plurality of spot points.

Providing such a tunneled portion 12 results in formation of a hollow passage 14 to permit the wiring harness 2 to be arranged in a space between the tunneled portion 12 and the inner panel 5. Also, the flat shaped sealing surface 5b of the inner panel 5 is opposed to the tunneled portion 12.

With the structure set forth above, now, a method of arranging the wiring harness 2 is described below in detail.

First, a terminal end of the wiring harness, which is internally arranged in the vehicle body, is picked up and pulled out from a takeoff hole H formed in the vehicle body at a left and upper position of the trunk opening portion 3.

Subsequently, the terminal end of the wiring harness 2 is inserted and passed through a water-proof boot 15 formed in a bellows configuration and, thereafter, is forced into an internal space of the trunk lid 1 via an insertion bore 5c formed at a corresponding area of the inner panel 5. Then, the terminal end of the wiring harness 2 is guided with the passage 14 to reach the vicinity of the mount opening portion 10.

Next, if the terminal end of the wiring harness 2 reaches the vicinity of the mount opening portion 10, then the terminal end of the wiring harness 2 is picked up and pulled out from the mount opening portion 10.

And, the terminal end of the wiring harness 2 is connected to the actuator DA, whereupon the actuator DA is mounted to the mount opening portion 10, thereby completing the arranging of the wiring harness 2.

Finally, after the arranging of the wiring harness 2 has been terminated, fitting upper and lower terminal ends of the water-proof boot 15 exposed between the trunk lid 1 and the vehicle body into the takeoff H and the insertion bore 5c, respectively, results in completion of a water-proof measure.

With the structure of the presently filed embodiment, as previously described above, forming the tunneled portion 12 in the reinforcement 11 enables the terminal end of the wiring harness 2 forced into the internal space of the trunk lid 1 to be reliably guided to the vicinity of the mount opening portion 10 with no need for a skilled worker and, hence, it becomes possible for the arranging operation of the wiring harness 2 to be easily and precisely performed.

Further, with the presently filed embodiment, since the top wall of the tunneled portion 12 is joined to the outer panel 4 by means of the mastic adhesive 13, the outer panel 4 has an increased tensioning rigidity. For this reason, the thickness of the outer panel 4 can be reduced, resulting in a contribution to a reduction in the weight of the vehicle body.

Furthermore, with the presently filed embodiment, since the tunneled portion 12 is formed at the position corresponding to the seal portion 8 to render the reinforcement 11 to be separately displaced from the sealing surface 5b, the sealing surface 5b is able to be resiliently deformed due to a contact pressure with the seal portion 8, resulting in an increased sealing property with respect to the seal portion 8.

Also, while the presently filed embodiment has been described with reference to an example wherein the trunk lid 1 is mounted to the trunk opening 3 as the closure body, the present invention is not limited to such a particular example, it is to be noted that the closure body may be applied to other structures, such as an engine hood, a back door and side doors, provided that the other structures have a hollow configuration and can be mounted for opening and closing capabilities.

The entire content of a Patent Application No. TOKUGAN 2002-014147 with a filing date of Jan. 23, 2002 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A vehicle closure body structure comprising:

an outer panel;

an inner panel opposed to the outer panel, with the outer panel and the inner panel forming a hollow structure of a closure body adapted to be mounted to an opening portion of a vehicle body through a hinge secured to the inner panel;

a reinforcement joined to the inner panel, inside the closure body, in at least a hinge fixing area thereof at which the hinge is fixed; and a tunneled portion formed in the reinforcement to form a passage between the tunneled portion and the inner panel so as to permit wiring harness to be arranged therein.

2. The vehicle closure body structure according to claim 1, wherein the wiring harness is introduced from the inner panel into the inside of the closure body to permit the wiring harness to be arranged to an electric power demanded area of the closure body.

3. The vehicle closure body structure according to claim 2, wherein the tunneled portion, is structured to form a hollow passage, which extends along a path in which the wiring harness is arranged, for guiding the wiring harness.

4. The vehicle closure body structure according to claim 1, wherein the reinforcement extends from the hinge fixing area of the inner panel toward the electric power demanded area of the closure body.

5. The vehicle closure body structure according to claim 4, wherein the reinforcement extends in a fore and aft direction of the vehicle body to reach the electric power demanded area of the closure body from the hinge fixing area of the inner panel.

6. A vehicle closure body structure comprising:

an outer panel;

an inner panel opposed to the outer panel, with the outer panel and the inner panel forming a hollow structure of a closure body adapted to be mounted to an opening portion of a vehicle body through a hinge secured to the inner panel;

a reinforcement joined to the inner panel, inside the closure body, in at least a hinge fixing area thereof at which the hinge is fixed; and a tunneled portion formed in the reinforcement to form a passage between the tunneled portion and the inner panel so as to permit wiring harness to be arranged therein, wherein the tunneled portion has a height such that the tunneled portion is brought into contact with the outer panel or is close proximity to the outer panel, and the reinforcement is joined to the outer panel by means of an adhesive at a portion in which the tunneled portion is in contact with or in close proximity to the outer panel.

7. A vehicle closure body structure comprising:

an outer panel;

an inner panel opposed to the outer panel, with the outer panel and the inner panel forming a hollow structure of a closure body adapted to be mounted to an opening portion of a vehicle body through a hinge secured to the inner panel;

a reinforcement joined to the inner panel, inside the closure body, in at least a hinge fixing area thereof at which the hinge is fixed; and a tunneled portion formed in the reinforcement to form a passage between the tunneled portion and the inner panel so as to permit wiring harness to be arranged therein, wherein the inner panel has a sealing surface which is adapted to be held in abutting engagement with a seal portion located along a peripheral edge of the opening portion of the vehicle body, with the sealing surface being opposed to the tunneled portion.

8. The vehicle closure body structure according to claim 7, wherein the sealing surface is formed in a flat shape.

9. The vehicle closure body structure according to claim 7, wherein the inner panel has a higher rigidity portion than those of other areas at an area inside the sealing surface in a widthwise direction of the vehicle body, and the reinforcement is further joined to the higher rigidity portion or a vicinity thereof.

10. A vehicle closure body structure comprising:

an outer panel;

an inner panel opposed to the outer panel, with the outer panel and the inner panel forming a hollow structure of a closure body adapted to be mounted to an opening portion of a vehicle body through a hinge secured to the inner panel;

a reinforcement joined to the inner panel, inside the closure body, in at least a hinge fixing area thereof at which the hinge is fixed; and forming means for forming a passage so as to permit wiring harness to be arranged therein in connection with the inner panel, the forming means being disposed in the reinforcement.

11. A method of arranging wiring harness in a vehicle closure body, which has an outer panel, an inner panel opposed to the outer panel and a reinforcement joined to the inner panel, and which is mounted to an opening portion of a vehicle body through a hinge fixed to the inner panel, with the reinforcement being joined to the inner panel, inside the closure body, in at least a hinge fixing area thereof at which the hinge is fixed, the method comprising:

pulling out a terminal portion of wiring harness, which is internally arranged through a vehicle body, from a takeoff hole formed at a periphery of an opening portion of the vehicle body;

forcing the terminal portion of the wiring harness into an inside of the closure body;

permitting the wiring harness to travel through the inside of the closure body while guiding the terminal portion of the wiring harness through a tunneled portion formed in the reinforcement; and taking out the terminal portion of the wiring harness from an opening portion of the closure body.

* * * * *